United States Patent
Li et al.

(10) Patent No.: US 12,550,077 B2
(45) Date of Patent: Feb. 10, 2026

(54) POWER ADJUSTMENT METHOD AND DEVICE THEREOF

(71) Applicant: HUAWEI TECHNOLOGIES CO., LTD., Guangdong (CN)

(72) Inventors: Xun Li, Shanghai (CN); Xiaolong Zhu, Shanghai (CN); Jiachong Zhou, Shanghai (CN); Yan Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/333,480

(22) Filed: Jun. 12, 2023

(65) Prior Publication Data
US 2023/0328662 A1   Oct. 12, 2023

Related U.S. Application Data

(63) Continuation of application No. PCT/CN2021/141839, filed on Dec. 28, 2021.

(30) Foreign Application Priority Data

Dec. 31, 2020 (CN) .......................... 202011637846.8

(51) Int. Cl.
  *H04W 52/36* (2009.01)
  *H04W 36/30* (2009.01)
  (Continued)

(52) U.S. Cl.
  CPC ......... *H04W 52/34* (2013.01); *H04W 36/302* (2023.05); *H04W 52/325* (2013.01); *H04W 52/367* (2013.01)

(58) Field of Classification Search
  None
  See application file for complete search history.

(56) References Cited

U.S. PATENT DOCUMENTS

| 9,503,953 B1 | 11/2016 | Oroskar et al. |
| 10,251,075 B1 | 4/2019 | Panchal |

(Continued)

FOREIGN PATENT DOCUMENTS

| CN | 105453461 A | 3/2016 |
| CN | 106604325 A | 4/2017 |

(Continued)

*Primary Examiner* — Idowu O Osifade

(57) ABSTRACT

The disclosure provides a power adjustment method and apparatus for adjusting power of a serving cell. The serving cell sends a first message to a first terminal to indicates to configure a first measurement bandwidth as a center bandwidth, where a frequency range of the center bandwidth is less than a frequency range of a full bandwidth, the full bandwidth represents a maximum bandwidth allocated to the serving cell, and the first measurement bandwidth is used by the first terminal to measure channel quality; the serving cell reduces power in a second bandwidth, where a frequency range of the second bandwidth is a frequency range obtained by subtracting the frequency range of the center bandwidth from the frequency range of the full bandwidth; and the serving cell increases power in the center bandwidth. The increase of the power in the center bandwidth can increase a coverage of the serving cell.

19 Claims, 8 Drawing Sheets

(51) Int. Cl.
*H04W 52/32* (2009.01)
*H04W 52/34* (2009.01)

(56) References Cited

U.S. PATENT DOCUMENTS

| | | | |
|---|---|---|---|
| 2007/0032237 A1 | 2/2007 | Chang et al. | |
| 2017/0366996 A1* | 12/2017 | Park | H04W 48/20 |
| 2020/0068572 A1 | 2/2020 | Lindoff et al. | |
| 2020/0092831 A1 | 3/2020 | Astrom et al. | |
| 2020/0128491 A1 | 4/2020 | Drugge et al. | |
| 2020/0351126 A1* | 11/2020 | Siomina | H04W 76/25 |
| 2020/0373973 A1* | 11/2020 | Hessler | H04B 7/0452 |

FOREIGN PATENT DOCUMENTS

| | | |
|---|---|---|
| CN | 107889121 A | 4/2018 |
| JP | 2013524616 A | 6/2013 |

* cited by examiner

POWER ADJUSTMENT METHOD AND DEVICE THEREOF

CROSS-REFERENCE TO RELATED APPLICATIONS

This application is a continuation of International Application No. PCT/CN2021/141839, filed on Dec. 28, 2021, which claims priority to Chinese Patent Application No. 202011637846.8, filed on Dec. 31, 2020. The disclosures of the aforementioned applications are hereby incorporated by reference in their entireties.

TECHNICAL FIELD

Embodiments of this application relate to the field of communication technologies, and specifically, to a power adjustment method and a device thereof.

BACKGROUND

A massive antenna array (FDD Massive MIMO, FDD MIMO) technology is a multi-antenna technology that allows a plurality of users to multiplex a same time-frequency resource, to double spectral efficiency.

The FDD MIMO is mainly used in a capacity scenario. As users of a live network increase, a requirement for coverage becomes increasingly high. For example, the FDD massive MIMO technology is used for coverage in rural areas with large inter-site distances and more loads distributed from low bands. These requirements are essentially requirements for coverage improvement. To improve a coverage, power of an active antenna unit (active antenna unit, AAU) is usually increased, in other words, power of more AAUs is used to improve the coverage.

However, due to cost control and performance limitation of a device, the device cannot continuously increase power of an AAU. Therefore, when the power of the AAU of the current device is limited, increasing of a coverage of a signal is limited.

SUMMARY

Embodiments of this application provide a power adjustment method, to improve a coverage of a signal of a serving cell.

A first aspect of embodiments of this application provides a power adjustment method, including:

A serving cell sends a first message to a first terminal, where the first message indicates the first terminal to configure a first measurement bandwidth as a center bandwidth, a frequency range of the center bandwidth is less than a frequency range of a full bandwidth, the full bandwidth represents a maximum bandwidth allocated to the serving cell, and the first measurement bandwidth is a bandwidth used by the first terminal to measure channel quality; the serving cell reduces power in a second bandwidth, where a frequency range of the second bandwidth is a frequency range obtained by subtracting the frequency range of the center bandwidth from the frequency range of the full bandwidth; and the serving cell increases power in the center bandwidth.

In embodiments of this application, the serving cell sends, to the first terminal, the first message that is used to set the measurement bandwidth as the center bandwidth, reduces the power in the second bandwidth, and increases the power in the center bandwidth, so that the first terminal receives a stronger measurement signal based on a fact that the measurement bandwidth is the center bandwidth. This improves a coverage of a signal of the serving cell.

Based on the implementation of the first aspect, in a possible implementation, that the serving cell increases power in the center bandwidth includes: The serving cell increases power of a cell-specific reference signal CRS port in the center bandwidth, where the CRS port is configured to send a CRS signal, and the CRS signal is used by the first terminal to measure channel quality.

In embodiments of this application, the power of the CRS port in the center bandwidth is increased, so that a coverage of the measurement signal of the serving cell is increased.

Based on the implementation of the first aspect, in a possible implementation, the CRS port includes a CRS port 0 and a CRS port 1. That the serving cell increases power of the CRS port in the center bandwidth includes: The serving cell increases power of the CRS port 0 and the CRS port 1 in the center bandwidth.

In embodiments of this application, the power of the port 0 and the power of the port 1 are increased, so that the coverage of the measurement signal of the serving cell is increased.

Based on the implementation of the first aspect, in a possible implementation, that the serving cell reduces power in the second bandwidth includes: The serving cell reduces power of the CRS port in the second bandwidth, where the CRS port is configured to send a CRS signal, and the CRS signal is used by the first terminal to measure channel quality.

In embodiments of this application, the power of the CRS port in the second bandwidth is reduced, and implementability of the solution is improved.

Based on the implementation of the first aspect, in a possible implementation, the CRS port includes a CRS port 2 and a CRS port 3. That the serving cell reduces power of the CRS port in the second bandwidth includes: The serving cell reduces power of the CRS port 2 and the CRS port 3 in the second bandwidth.

In this embodiment of this application, the power of the port 2 and the port 3 in the second bandwidth is reduced, and implementability of the solution is improved.

Based on the implementation of the first aspect, in a possible implementation, the first terminal includes a target terminal, and the target terminal is a terminal that does not support an indication of the first message. The method further includes: The serving cell identifies the target terminal, and obtains first measurement compensation information, where the first measurement compensation information is used to compensate a measurement value of the target terminal, so that the target terminal keeps connected to the serving cell.

In embodiments of this application, the first measurement compensation information is obtained, so that the target terminal can keep connected to the serving cell.

Based on the implementation of the first aspect, in a possible implementation, that the serving cell identifies the target terminal includes: The serving cell starts a timer when the target terminal accesses the serving cell; and if the target terminal is handed over to a target cell before the timer expires, the serving cell determines that the target terminal is the terminal that does not support the indication of the first message, and the target cell is a neighboring cell.

In embodiments of this application, the timer is used to determine that the target terminal is the terminal that does not support the indication of the first message. This improves implementability of the solution.

Based on the implementation of the first aspect, in a possible implementation, that the serving cell identifies the target terminal includes: The serving cell compares a first measurement value of the target terminal with a second measurement value of the target terminal to obtain a measurement difference, where the first measurement value is a value obtained by measuring channel quality of the serving cell before the target terminal is handed over to the serving cell, and the second measurement value is a value obtained by measuring channel quality of the serving cell after the target terminal is handed over to the serving cell; and if the measurement difference is greater than a preset threshold, the serving cell determines that the target terminal is the terminal that does not support the indication of the first message.

In embodiments of this application, by comparing the first measurement value and the second measurement value, it is determined that the target terminal is the terminal that does not support the indication of the first message. This improves implementability of the solution.

Based on the implementation of the first aspect, in a possible implementation, before the serving cell compares the first measurement value of the target terminal with the second measurement value of the target terminal to obtain the measurement difference, the method further includes: The serving cell receives the first measurement value sent by the target cell, where the first measurement value is a value obtained by measuring channel quality of the serving cell when the terminal is connected to the target cell.

In embodiments of this application, the first measurement value sent by the target cell is received, so that implementability of the solution is improved.

Based on the implementation of the first aspect, in a possible implementation, the serving cell and the target cell are cells corresponding to a same active antenna unit AAU, and the first measurement value and the second measurement value are measured based on uplink RSRP of the serving cell.

In embodiments of this application, both the first measurement value and the second measurement value are measured based on the uplink RSRP of the serving cell, to avoid a case in which the target terminal performs ping-pong handover.

Based on the implementation of the first aspect, in a possible implementation, the method further includes: The serving cell determines, based on uplink quality of the target terminal and downlink quality of the target terminal, whether the target terminal performs cell handover; and if either the uplink quality of the target terminal or the downlink quality of the target terminal is less than the preset threshold, the serving cell sends a handover command to the target terminal, where the handover command instructs the target terminal to perform cell handover.

In embodiments of this application, the serving cell determines, based on the uplink quality of the target terminal and the downlink quality of the target terminal, whether the target terminal performs cell handover. This increases channel quality of a connection of the target terminal, and further improves user experience.

A second aspect of this application provides a serving cell, including:
  a sending unit, configured to send a first message to a first terminal, where the first message indicates the first terminal to configure a first measurement bandwidth as a center bandwidth, a frequency range of the center bandwidth is less than a frequency range of a full bandwidth, the full bandwidth represents a maximum bandwidth allocated to the serving cell, and the first measurement bandwidth is a bandwidth used by the first terminal to measure channel quality;
  a reduction unit, configured to reduce power in a second bandwidth, where a frequency range of the second bandwidth is a frequency range obtained by subtracting the frequency range of the center bandwidth from the frequency range of the full bandwidth; and
  an increasing unit, configured to increase power in the center bandwidth.

Based on the serving cell in the second aspect, in a possible implementation, the increasing unit is specifically configured to increase power of a cell-specific reference signal CRS port in the center bandwidth, where the CRS port is configured to send a CRS signal, and the CRS signal is used by the first terminal to measure channel quality.

Based on the serving cell in the second aspect, in a possible implementation, the CRS port includes a CRS port 0 and a CRS port 1, and the increasing unit is specifically configured to increase power of the CRS port 0 and the CRS port 1 in the center bandwidth.

Based on the serving cell in the second aspect, in a possible implementation, the reduction unit is specifically configured to reduce power of the CRS port in the second bandwidth, where the CRS port is used to send a CRS signal, and the CRS signal is used by the first terminal to measure channel quality.

Based on the serving cell in the second aspect, in a possible implementation, the CRS port includes a CRS port 2 and a CRS port 3, and the reduction unit is specifically configured to reduce power of the CRS port 2 and the CRS port 3 in the second bandwidth.

Based on the serving cell in the second aspect, in a possible implementation, the first terminal includes a target terminal, the target terminal is a terminal that does not support an indication of the first message. The serving cell further includes:
  an identification unit, configured to identify the target terminal; and
  an obtaining unit, configured to obtain first measurement compensation information, where the first measurement compensation information is used to compensate a measurement value of the target terminal, so that the target terminal keeps connected to the serving cell.

Based on the serving cell in the second aspect, in a possible implementation, when the target terminal accesses the serving cell, the serving cell further includes:
  a starting unit, configured to start a timer.
  If the target terminal is handed over to a target cell before the timer expires, the serving cell further includes:
  a determining unit, configured to determine that the target terminal is the terminal that does not support the indication of the first message, and the target cell is a neighboring cell.

Based on the serving cell in the second aspect, in a possible implementation, the identification unit is specifically configured to compare a first measurement value of the target terminal with a second measurement value of the target terminal to obtain a measurement difference, where the first measurement value is a value obtained by measuring channel quality of the serving cell before the target terminal is handed over to the serving cell, and the second measurement value is a value obtained by measuring channel quality of the serving cell after the target terminal is handed over to the serving cell.

If the measurement difference is greater than a preset threshold, the determining unit is specifically configured to determine that the target terminal is the terminal that does not support the indication of the first message.

Based on the serving cell in the second aspect, in a possible implementation, the serving cell further includes:
 a receiving unit, configured to receive the first measurement value sent by the target cell, where the first measurement value is a value obtained by measuring channel quality of the serving cell when the terminal is connected to the target cell.

Based on the serving cell of the second aspect, in a possible implementation, the serving cell and the target cell are cells corresponding to a same active antenna unit AAU, and the first measurement value and the second measurement value are measured based on uplink RSRP of the serving cell.

Based on the serving cell in the second aspect, in a possible implementation, the serving cell further includes:
 a judging unit, configured to determine, based on uplink quality of the target terminal and downlink quality of the target terminal, whether the target terminal performs cell handover.

If either the uplink quality of the target terminal or the downlink quality of the target terminal is less than the preset threshold, the sending unit is further configured to send a handover command to the target terminal, where the handover command instructs the target terminal to perform cell handover.

A method performed by each unit of the serving cell in the second aspect of this application is similar to the power adjustment method in the first aspect. Details are not described herein again.

A third aspect of this application provides a computer storage medium. The computer storage medium stores instructions, and when the instructions are executed on a computer, the computer is enabled to perform the method according to the implementation of the first aspect of this application.

A fourth aspect of this application provides a computer program product. When the computer program product is executed on a computer, the computer is enabled to perform the method according to the implementation of the first aspect of this application.

According to the foregoing technical solutions, it can be learned that embodiments of this application have the following advantages.

In embodiments of this application, the serving cell sends, to the first terminal, the first message that is used to set the measurement bandwidth as the center bandwidth, reduces the power in the second bandwidth, and increases the power in the center bandwidth, so that the first terminal receives a stronger measurement signal based on a fact that the measurement bandwidth is the center bandwidth. This improves a coverage of the serving cell.

DESCRIPTION OF EMBODIMENTS

Embodiments of this application provide a power adjustment method and a device thereof.

The following describes the technical solutions in embodiments of this application with reference to the accompanying drawings in embodiments of this application. It is clear that the described embodiments are merely a part rather than all of embodiments of this application. All other embodiments obtained by persons of ordinary skill in the art based on embodiments of this application without creative efforts shall fall within the protection scope of this application.

Figure 1:
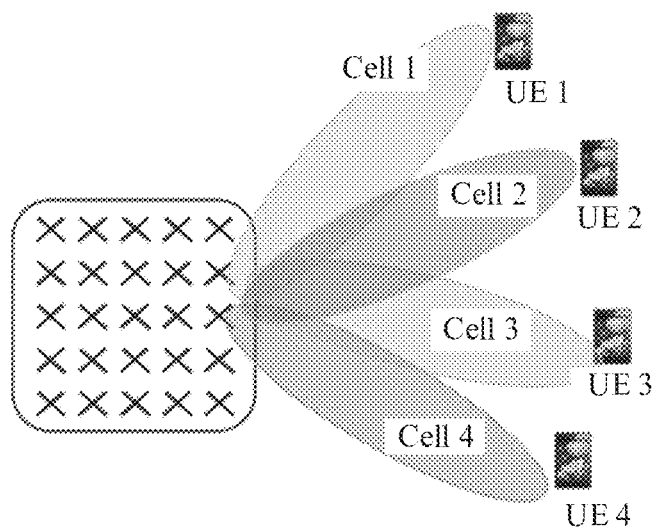
FIG. 1 is a schematic diagram of a scenario of a data transmission system according to an embodiment of this application.

FIG. 1 is a schematic scenario diagram of a data transmission system according to an embodiment of this application.

As shown in FIG. 1, the data transmission system includes one base station, one or more cells covered by the base station, and one or more terminals (UEs) covered by the one or more cells. The base station implements a plurality of cells in a sector by using a massive antenna array (FDD massive MIMO) technology and software, so that a plurality of users can reuse a same time-frequency resource, to improve spectral efficiency by a plurality of times.

The massive antenna array technology is mainly used in a capacity scenario. As users of a live network increase, a requirement for coverage becomes increasingly high. Some sites have proposed to expand application scenarios of the massive antenna array technology. For example, the massive antenna array technology is used for coverage in rural areas with large inter-site distances and distribution of more loads from low bands (700 MHz, 800 MHz, and 900 MHz). These requirements are essentially requirements for coverage improvement. Insufficient coverage leads to user churn, traffic reduce, and revenue reduce of an operator.

There are a plurality of manners in a conventional technology to increase coverage. In a first manner, overall power of an entire AAU is increased to increase the coverage.

However, due to cost control and device performance limitation, the power of the AAU cannot be continuously increased. Therefore, when the power of the AAU is limited, increasing of a coverage of a signal is limited.

In a second manner, a power ratio (PaPb) of a sent data signal to a sent pilot signal is reduced, where Pa is a ratio of the sent data signal to the sent pilot signal, and Pb is a ratio of data on different symbols (OFDM). On OFDM with a pilot signal, more power is aggregated for the pilot signal, so that the pilot signal measured by a terminal is stronger. Therefore, a farther user can access a network. This increases the coverage. For example, if a configuration of PaPb is (0,0), the coverage may be increased by configuring PaPb as (−3, 1) or (−6, 1), where (−3, 1) represents that sending power of the data signal is half of sending power of the pilot signal, and (−6, 1) represents that sending power of the data signal is one quarter of sending power of the pilot signal. However, if the sending power of the data signal is excessively low, a terminal is unstable when receiving data, and user experience deteriorates.

In a third manner, the coverage is adjusted by adjusting an engineering parameter of a base station, for example, adjusting electrical and a physical downtilt angle of an antenna of the base station, or installing the antenna at a higher height. These manners can increase a receive signal level of a user far away from the base station, but reduce signal strength of a user near the base station. That is, the signal strength of the user near the base station is reduced while the coverage is increased.

To increase the coverage without changing total power, an embodiment of this application provides a data processing method. Specific descriptions are as follows. For ease of understanding, some terms in this embodiment of this application are first explained.

| | | |
|---|---|---|
| Long term evolution | Long Term Evolution | LTE |
| Frequency division duplexing | Frequency Division Duplexing | FDD |
| Multiple input multiple output | Multiple Input Multiple Output | MIMO |
| Active antenna unit | Active Antenna Unit | AAU |
| Reference signal receiving power | Reference Signal Receiving Power | RSRP |
| Reference signal receiving quality | Reference Signal Receiving Quality | RSRQ |
| Cell-specific reference signal | Cell-specific Reference Signal | CRS |

Figure 2:
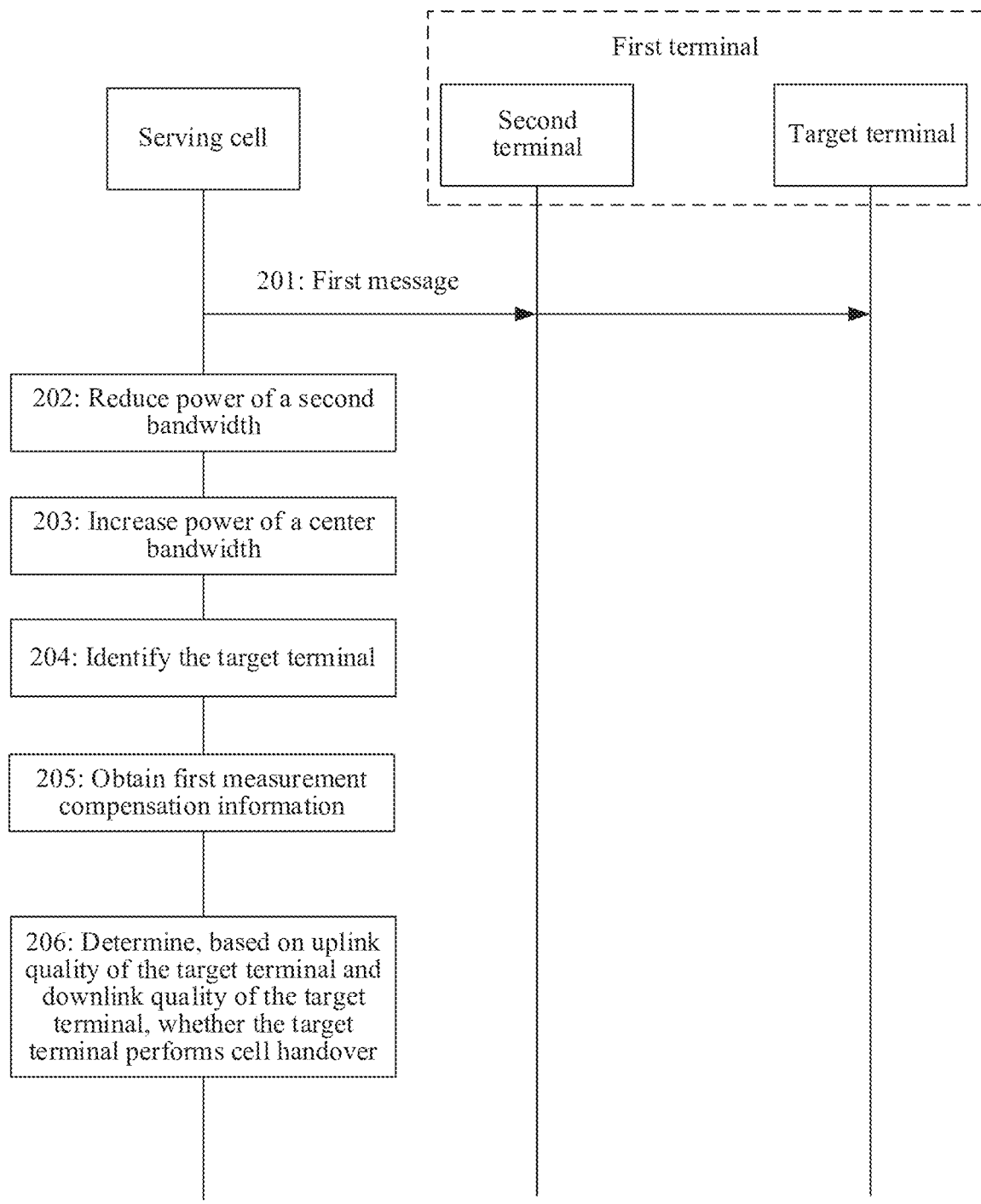
FIG. 2 is a schematic flowchart of a power adjustment method according to an embodiment of this application.

FIG. 2 is a schematic flowchart of a data processing method according to an embodiment of this application.

In step 201, a serving cell sends a first message to a first terminal.

When the serving cell needs to increase a coverage, the serving cell sends the first message to the first terminal. The first message indicates the first terminal to configure a first measurement bandwidth as a center bandwidth, a frequency range of the center bandwidth is less than a frequency range of a full bandwidth, and the full bandwidth represents a maximum bandwidth allocated to the serving cell. The first measurement bandwidth is a bandwidth used by the first terminal to measure channel quality.

Specifically, the first message is air interface signaling sent by the serving cell. In a possible implementation, the first message may be a broadcast message sent by the serving cell, and the broadcast message carries indication information that indicates the first terminal to configure the first measurement bandwidth as the center bandwidth. It may be understood that the first message may alternatively be other air interface signaling sent by the serving cell, for example, a separate indication message that indicates the first terminal to configure the first measurement bandwidth as the center bandwidth. A specific form of the first message is not limited herein.

The first measurement bandwidth represents a bandwidth used by the first terminal to measure a pilot signal. In a normal case, the first measurement bandwidth is usually set to the full bandwidth, namely, the maximum bandwidth allocated by the serving cell. The center bandwidth is a frequency range, in the full bandwidth, in which a center frequency is used as an origin and that spreads to frequencies on both sides of the full bandwidth, and is referred to as the center bandwidth. For example, if a frequency range of the full bandwidth is 1840 MHz to 1860 MHz, a frequency range of the center bandwidth may be 1848 MHz to 1852 MHz. The frequency range of the center bandwidth is not specifically limited in this embodiment of this application, provided that the frequency range of the center bandwidth is less than the frequency range of the full bandwidth.

After receiving the first message, the first terminal may set the first measurement bandwidth as the center bandwidth based on the first message. To be specific, before the setting, the first terminal measures the channel quality by using the full bandwidth, and after the setting, the first terminal measures the channel quality by using the frequency range corresponding to the center bandwidth.

It may be understood that the first terminal may be a terminal that has established a connection to the serving cell, or may be a terminal that is in a neighboring cell and that does not establish a connection to the serving cell, provided that the first terminal can receive the first message sent by the serving cell. This is not specifically limited herein.

In step 202, the serving cell reduces power in a second bandwidth.

After the serving cell sends the first message, the serving cell reduces the power in the second bandwidth. A frequency range of the second bandwidth is a frequency range obtained by subtracting the frequency range of the center bandwidth from the frequency range of the full bandwidth.

For example, the frequency range of the full bandwidth is 1840 MHz to 1860 MHz, and the frequency range of the center bandwidth is 1848 MHz to 1852 MHz. In this case, the frequency range of the second bandwidth is 1840 to 1847 MHz and 1853 to 1860 MHz. That is, the range of the second bandwidth is the frequency range obtained by subtracting the frequency range of the center bandwidth from the frequency range of the full bandwidth.

Specifically, in a possible implementation, after the serving cell sends the first message, the serving cell correspondingly adjusts power of the entire cell, to reduce the power in the second bandwidth. To ensure that the operation is transparent to a user and ensure that demodulation performance of a QAM modulation user is not degraded, the power in the second bandwidth is reduced without distinguishing a logical channel, an RS signal, a physical channel, and the like, that is, power of all RE resources corresponding to the second bandwidth is reduced.

In a possible implementation, when the power in the second bandwidth is reduced, power corresponding to a CRS port in the second bandwidth is not reduced. The CRS port is used to send a measurement signal, and the terminal performs channel quality measurement by using the measurement signal sent by the CRS port. Therefore, when power of another resource of the second bandwidth is reduced, the power corresponding to the CRS port is not reduced.

In a possible implementation, when the power in the second bandwidth is reduced, power of a port 0 and a port 1 in the CRS port in the second bandwidth is not reduced, and power of a port 3 and a port 4 in the CRS port may be reduced. When the terminal measures the channel quality, main interconnected ports are the port 0 and the port 1 in the CRS port. Therefore, not reducing the power of the port 0 and the port 1 helps improve a coverage for the terminal.

In step 203, the serving cell increases power in the center bandwidth.

After reducing the power in the second bandwidth, the serving cell increases the power in the center bandwidth.

Specifically, after reducing power of a resource corresponding to the second bandwidth, the serving cell shares the power by using an AAU physical channel, and the serving cell increases power of a resource corresponding to the central bandwidth. It should be noted that, if the serving cell reduces specific power of the resource corresponding to the second bandwidth, the serving cell increases specific power of the resource corresponding to the center bandwidth. For example, if the serving cell reduces 100 units of power of the resource corresponding to the second bandwidth, the serving cell increases 100 units of power of the resource corresponding to the center bandwidth. In an actual application process, alternatively, after 100 units of power of the resource corresponding to the second bandwidth is reduced, 80 units of power of the resource corresponding to the center bandwidth may be increased, or 100 units of power of the resource corresponding to the second bandwidth is reduced, and 120 units of power of the resource corresponding to the center bandwidth is increased. Specific power of the resource corresponding to the center bandwidth that needs to be increased may be determined based on an actual situation. This is not specifically limited herein.

In a possible implementation, the serving cell correspondingly adjusts the power of the entire cell, to increase power of resources corresponding to the entire center bandwidth. To ensure that the operation is transparent to the user and ensure that demodulation performance of the QAM modulation user is not degraded, the power in the center bandwidth is increased without distinguishing the logical channel, the RS signal, the physical channel, and the like, that is, power of all REs corresponding to the center bandwidth is increased.

In a possible implementation, when the power in the center bandwidth is increased, only power corresponding to a CRS port in the center bandwidth is increased. The CRS port is used to send a measurement signal, and the terminal performs channel quality measurement by using the measurement signal sent by the CRS port. Therefore, when the power in the center bandwidth is increased, only the power corresponding to the CRS port in the center bandwidth is increased.

In a possible implementation, when the power in the center bandwidth is increased, only power of the port 0 and the port 1 in the CRS port in the center bandwidth is increased. When the terminal measures the channel quality, main interconnected ports are the port 0 and the port 1 in the CRS port. Therefore, increasing the power of the port 0 and the port 1 in the CRS port in the center bandwidth helps improve the coverage for the terminal.

Figure 3:
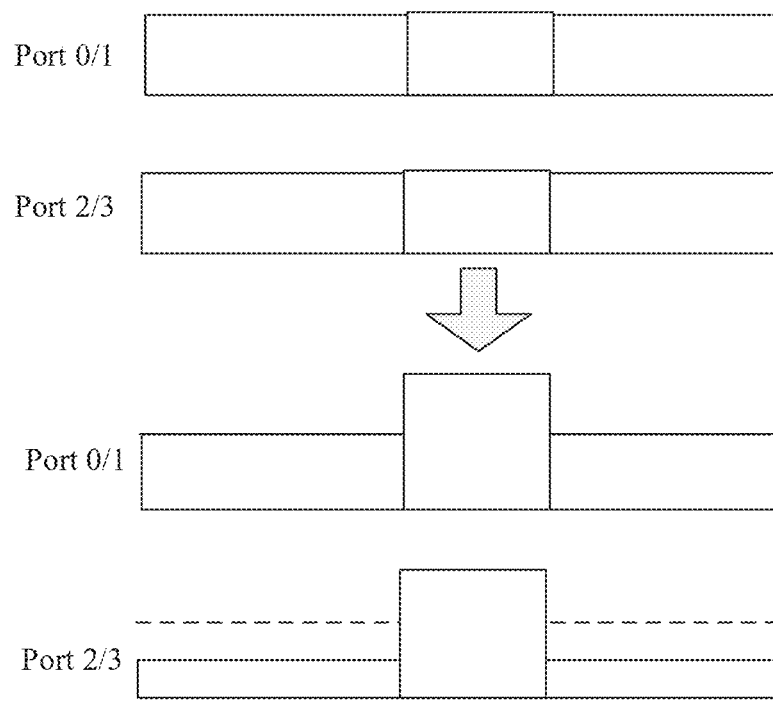
FIG. 3 is a schematic diagram of effect of a power adjustment method according to an embodiment of this application.

For example, as shown in FIG. 3, the serving cell does not reduce the power of the port 0 and the port 1 in the CRS port in the second bandwidth, but only reduces power of the port 2 and the port 3 in the CRS port in the second bandwidth, and increases power of the entire CRS port in the center bandwidth.

Figure 4:
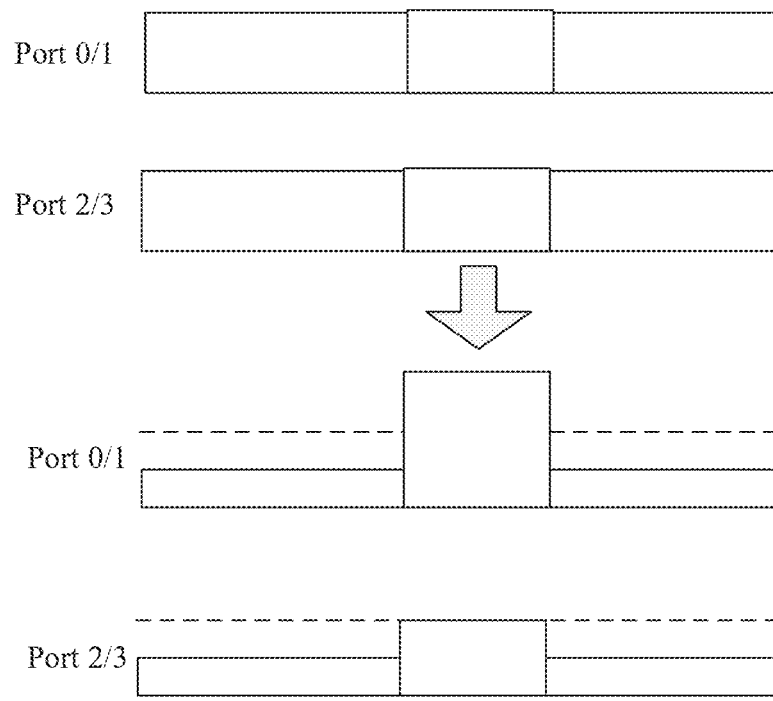
FIG. 4 is another schematic diagram of effect of a power adjustment method according to an embodiment of this application.

As shown in FIG. 4, the serving cell reduces power corresponding to all resources in the second bandwidth, and when increasing power, the serving cell increases only the power of the port 0 and the port 1 in the CRS port in the center bandwidth.

Figure 5:
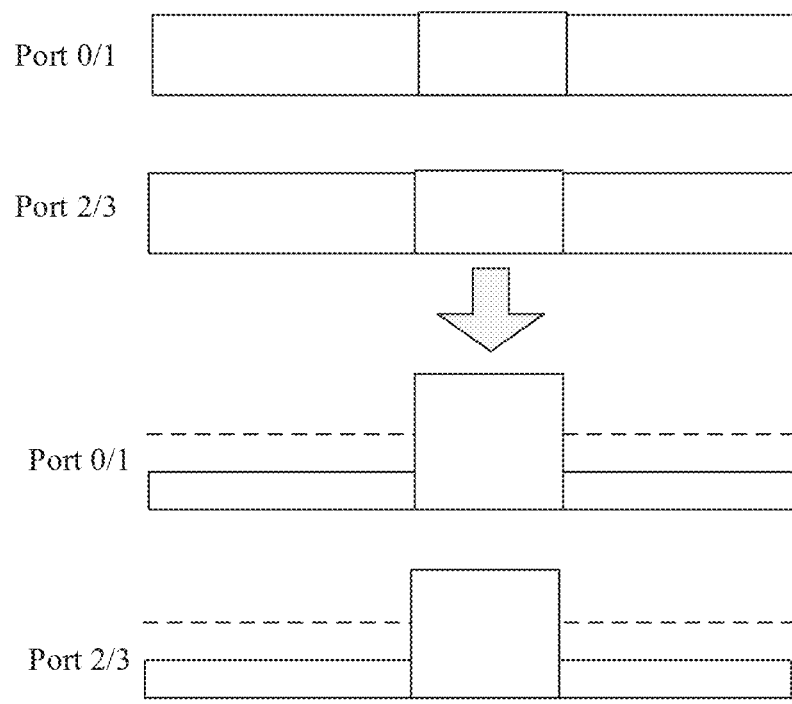
FIG. 5 is another schematic diagram of effect of a power adjustment method according to an embodiment of this application.

As shown in FIG. 5, the serving cell reduces power corresponding to all resources in the second bandwidth, and when increasing power, the serving cell also increases power corresponding to all resources in the center bandwidth, that is, also increases power of all ports in the CRS port in the center bandwidth.

Figure 6:
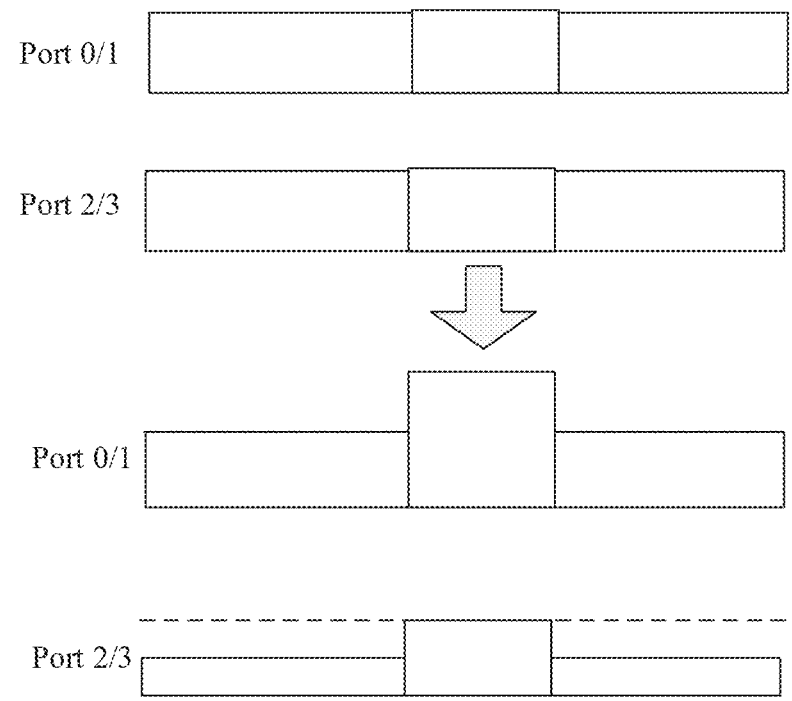
FIG. 6 is another schematic diagram of effect of a power adjustment method according to an embodiment of this application.

As shown in FIG. 6, the serving cell does not reduce the power of the port 0 and the port 1 in the CRS port in the second bandwidth, but only reduces power of the port 2 and the port 3 in the CRS port in the second bandwidth, and when increasing power, the serving cell only increases the power of the port 0 and the port 1 in the CRS port in the center bandwidth.

In step 204, the serving cell identifies the target terminal.

After the serving cell increases the power in the center bandwidth, after the first terminal that receives the first message sets a measurement bandwidth as the center bandwidth, the measured channel quality also increases. However, in an actual application process, the first terminal includes a second terminal and a target terminal. The second terminal is a terminal that supports the first message, and the target terminal is a terminal that does not support an indication of the first message. That is, after receiving the first message, the second terminal sets a measurement bandwidth of the second terminal as the center bandwidth based on the indication information in the first message. After receiving the first message, the target terminal does not set a measurement bandwidth of the target terminal as the center bandwidth based on the indication information in the first message because the first message is not supported in a protocol. Therefore, for this type of target terminal, the serving cell first identifies the target terminal in the first terminal, and then performs corresponding management.

In the actual application process, in a possible implementation, that the target terminal does not support the indication information of the first message is represented as that the target terminal does not support the indication information of the first message sent by the serving cell. However, during neighboring cell measurement, if the neighboring cell is set to increase power in a center bandwidth, the target terminal may perform measurement based on a resource of the center bandwidth configured for the neighboring cell. In this way, when a measurement result is greater than that of the serving cell, the target terminal is handed over to the neighboring cell, and the target terminal performs channel measurement on the serving cell (namely, the neighboring cell before handover) based on the full bandwidth, and performs channel measurement on the neighboring cell (namely, the serving cell before handover) based on the center bandwidth. Therefore, a value obtained through channel measurement of the current serving cell is less than a value obtained through channel measurement of the neighboring cell, so that the target terminal is handed over back to the serving cell. In this process, the target terminal may repeatedly perform handover, resulting in a ping-pong handover.

Figure 7:
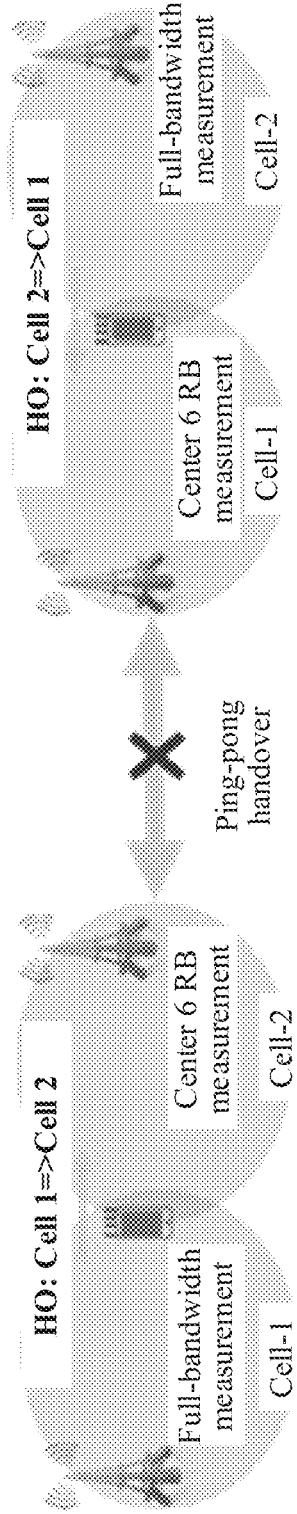
FIG. 7 is a schematic diagram of a scenario of a power adjustment method according to an embodiment of this application.

For example, as shown in FIG. 7, the target terminal is located between a cell cell-1 and a cell cell-2. When the target terminal is connected to the cell cell-1, a bandwidth for measurement performed by the target terminal on the cell cell-1 is a full bandwidth, and a bandwidth for measurement on the cell-2 is a center bandwidth set for the cell-2, namely, a center bandwidth of six RBs. After the cell-2 increases the power in the center bandwidth, the channel quality measured by the target terminal in the cell-2 is increased. Therefore, the target terminal is handed over to the cell-2. When the target terminal is connected to the cell-2, a bandwidth for measurement performed by the target terminal on the cell-2 is a full bandwidth, and a bandwidth for measurement performed by the target terminal on the cell-1 is a center bandwidth set for the cell-1, namely, a center bandwidth of six RBs. After the cell-1 increases the power in the center bandwidth, the channel quality measured by the target terminal in the cell-1 is increased. Therefore, the target terminal is handed over to the cell-1 again. In this case, a ping-pong handover occurs.

To avoid the ping-pong handover, the serving cell needs to first identify the target terminal in the first terminal, and then perform corresponding management.

Specifically, in a possible implementation, after the first terminal accesses the serving cell, the serving cell starts a timer. A time range of the timer is a preset threshold. The preset threshold may be an empirical value or a value specified in a protocol. This is not specifically limited herein. Before the timer expires, if the first terminal is handed over to a target cell, and the target cell is a neighboring cell, the serving cell determines that the target terminal is the target terminal that does not support the indication of the first message.

Figure 8:
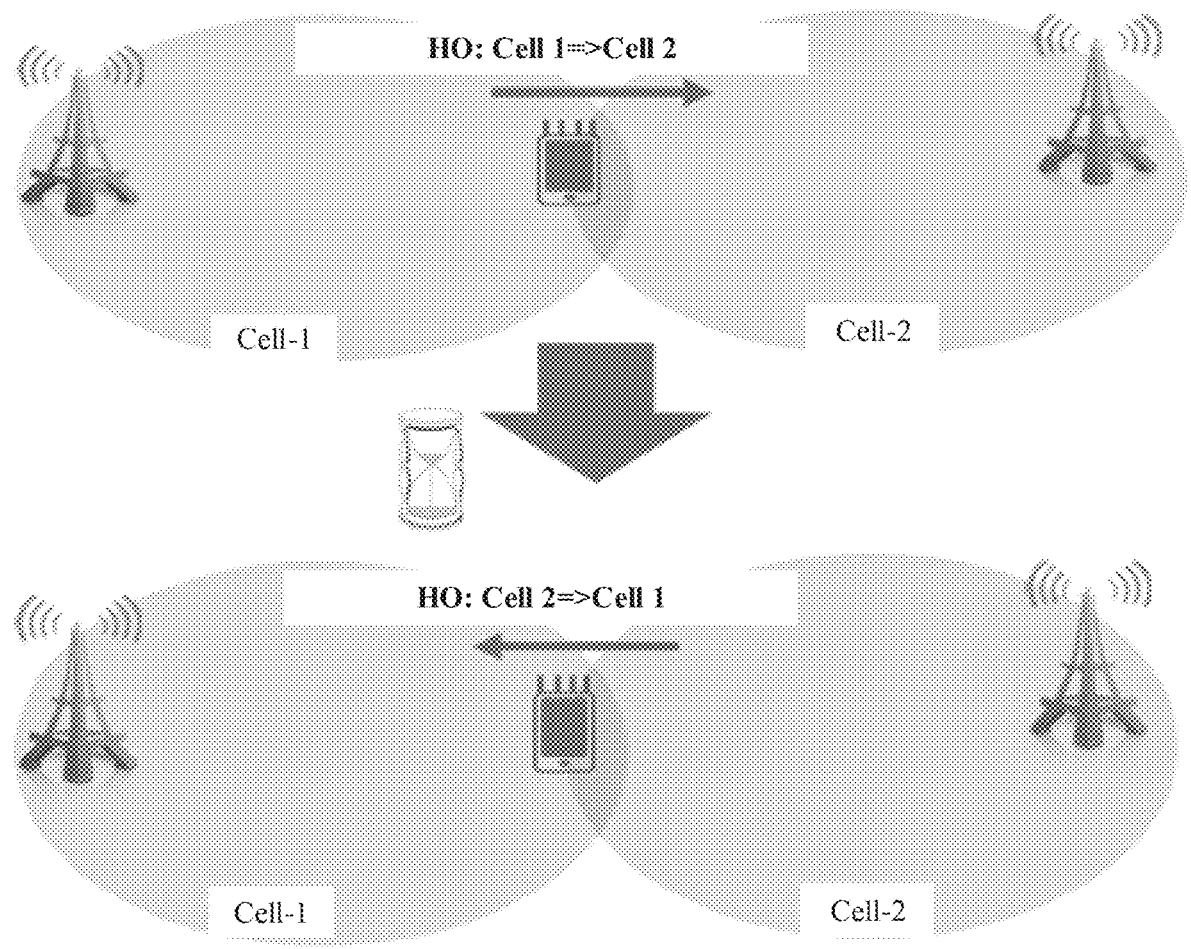
FIG. 8 is a schematic diagram of another scenario of a power adjustment method according to an embodiment of this application.

For example, as shown in FIG. 8, when a terminal is handed over from the cell 1 to the cell 2, the cell 1 starts a timer. If the terminal is handed over back from the cell 2 to the cell 1 before the timer expires, it is determined that the terminal is the target terminal.

In a possible implementation, the serving cell may compare the first measurement value of the target terminal with the second measurement value of the target terminal to obtain a measurement difference. If the measurement difference is greater than a preset threshold, the serving cell determines that the target terminal is the terminal that does not support the indication of the first message. The first measurement value is a value obtained by measuring channel quality of the serving cell before the target terminal is handed over to the serving cell, and the second measurement value is a value obtained by measuring channel quality of the serving cell after the target terminal is handed over to the serving cell.

In the actual application process, the first measurement value and the second measurement value may be RSRP or RSRQ measured by the target terminal for the serving cell. This is not specifically limited herein.

Figure 9:
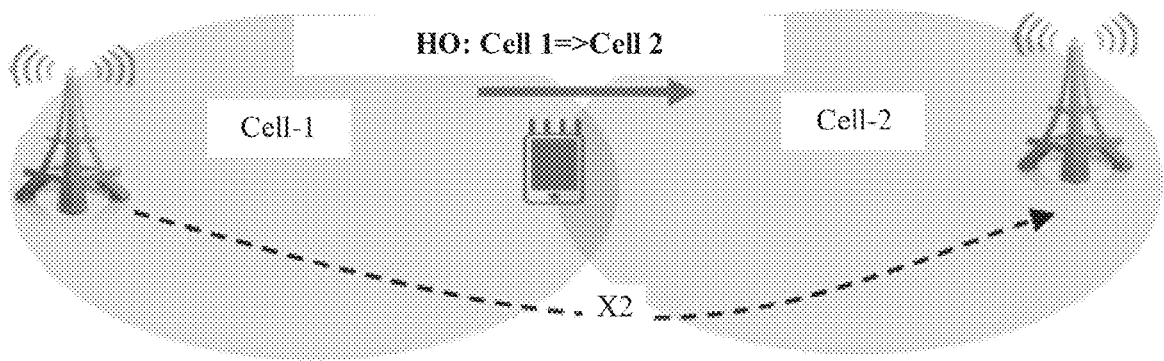
FIG. 9 is a schematic diagram of another scenario of a power adjustment method according to an embodiment of this application.

When the serving cell and the target cell are different cells covered by a same base station, the serving cell may directly obtain the first measurement value and the second measurement value of the target terminal. As shown in FIG. 9, when the serving cell (the cell-2) and the target cell (the cell-1) are different cells covered by different base stations, the serving cell may obtain, from the target cell through an X2 interface, the first measurement value measured when the target terminal is connected to the target cell, and compare the first measurement value with the second measurement value to finally determine whether the target terminal is a terminal that does not support the indication of the first message. It may be understood that, in the actual application process, the serving cell may further obtain the first measurement value from the target cell in another manner, for example, obtain the first measurement value from high-layer signaling sent to the serving cell by the target cell. This is not specifically limited herein.

In step 205, the serving cell obtains first measurement compensation information.

After the serving cell identifies the target terminal, the serving cell obtains the first measurement compensation information. The first measurement compensation information is used to compensate a measurement value of the target terminal, so that the target terminal can keep connected to the serving cell.

Specifically, in a possible implementation, the first measurement compensation information may include a measurement compensation value for the serving cell, and when the target terminal performs channel measurement on the serving cell, the measurement compensation value is added to a measurement value obtained by performing channel measurement by the target terminal on the serving cell. In this way, the measurement value of the serving cell measured by the target terminal may be increased, and the terminal continues to keep connected to the serving cell.

When the target terminal performs cell handover, the target terminal further measures channel quality of the target cell. Therefore, when the channel quality of the target cell is better, the target terminal still performs cell handover. In a possible implementation, the serving cell may further carry a handover hysteresis value in the first measurement compensation information. To be specific, when the target terminal performs cell handover, the target terminal subtracts the handover hysteresis value from a measurement value of the target cell to obtain a final measurement value of the target cell. Therefore, after the handover hysteresis value is added, the measurement value of the target cell measured by the target terminal may be less than the measurement value of the serving cell. Therefore, the target terminal may continue to keep connected to the serving cell.

Figure 10:
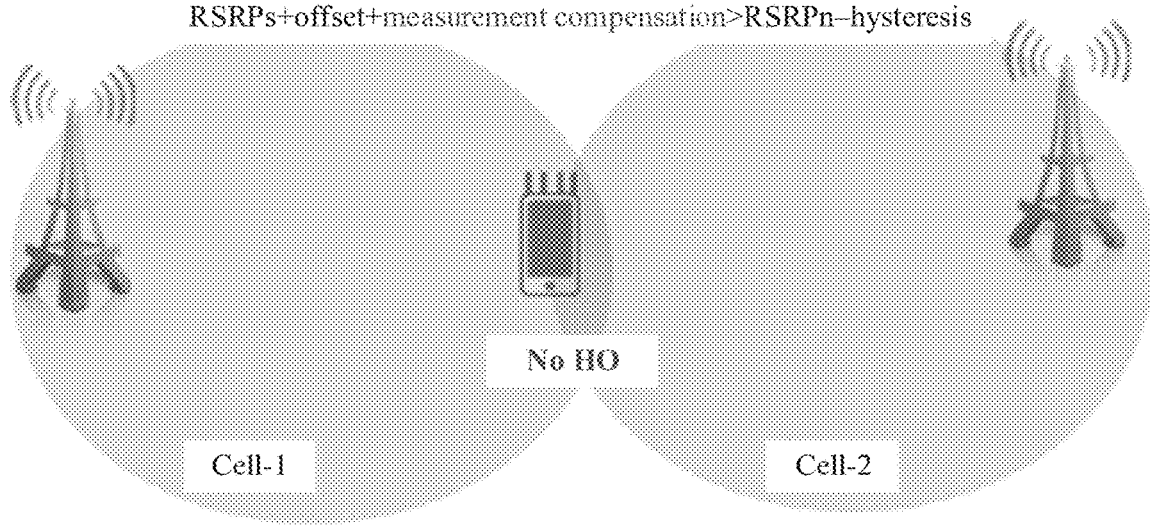
FIG. 10 is a schematic diagram of another scenario of a power adjustment method according to an embodiment of this application.

For example, as shown in FIG. 10, when the target terminal is connected to the cell-1, a measurement value RSRPs of the cell-1 measured by the target terminal is equal to a full-bandwidth measurement value of RSRPcell-1, and a measurement value RSRPn of the cell-2 measured by the target terminal is equal to a center bandwidth (six RBs) measurement value of RSRPcell-2. The target terminal determines, according to the following formula, whether to perform handover:

RSRPs+offset+measurement compensation value>RSRPn−handover hysteresis value.

When a sum obtained by adding the measurement value RSRPs of the serving cell, the offset value, and the measurement compensation value is greater than a difference obtained by subtracting the handover hysteresis value from the measurement value RSRPn, it indicates that the target terminal continues to camp on the serving cell and does not perform handover.

It should be noted that the first measurement compensation information may be compensated in the serving cell, or may be compensated on a terminal side. If compensation is performed on the terminal side, the serving cell sends the first measurement compensation information to the terminal, and after receiving the first measurement compensation information, the terminal performs related calculation on the channel quality based on the first measurement compensation information.

In step 206, the serving cell determines, based on uplink quality of the target terminal and downlink quality of the target terminal, whether the target terminal performs cell handover.

The serving cell may send the first measurement compensation information to the target terminal, so that the target terminal can continue to keep connected to the serving cell. However, in the actual application process, if quality of a link between the target terminal and the serving cell is excessively low, a call drop, a connection failure, or the like may occur on the target terminal. Therefore, the serving cell further needs to determine, based on the uplink quality of the target terminal and the downlink quality of the target terminal, whether the target terminal performs cell handover.

Specifically, the serving cell may measure the uplink quality and the downlink quality of the target terminal through downlink CQI measurement, uplink RSRP measurement, or the like. If either the uplink quality or the downlink quality is less than a preset threshold, or both the uplink quality and the downlink quality are less than a preset threshold, it is determined that the target terminal is a low-efficiency user, and cell handover is initiated for the target terminal, to prevent a call drop or a handover failure caused by delayed handover.

Specifically, the serving cell may send a handover command to the target terminal, where the handover command instructs the target terminal to perform cell handover. After receiving the handover command, the target terminal may initiate cell measurement, to measure channel quality of a cell other than the serving cell, and select a target cell with better channel quality to initiate cell handover.

Figure 11:
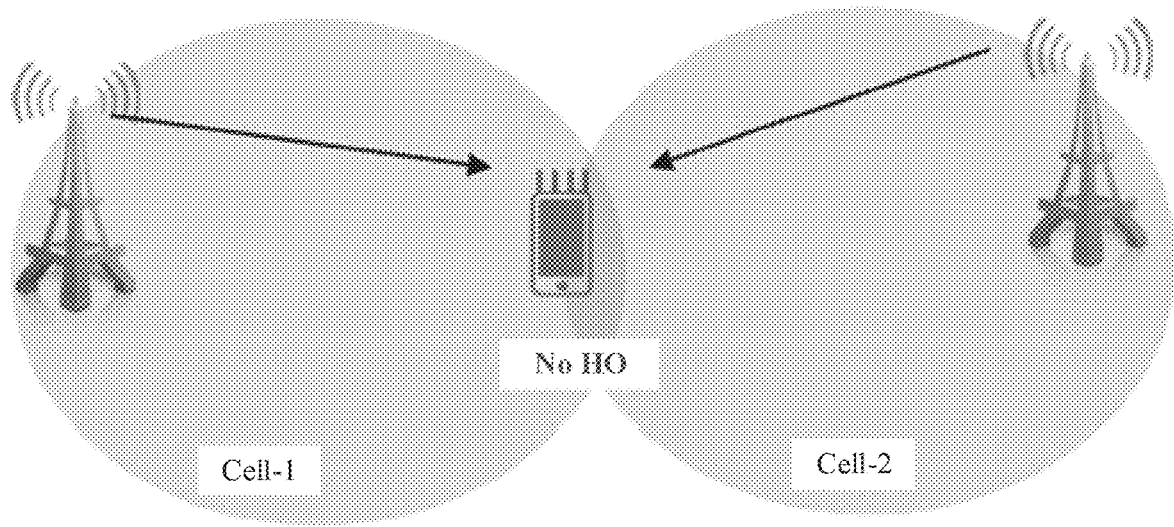
FIG. 11 is a schematic diagram of another scenario of a power adjustment method according to an embodiment of this application.

In this embodiment of this application, an objective is to increase coverage of an AAU cell. As shown in FIG. 11, if coverage of a same AAU is split into a plurality of cells, and the plurality of cells simultaneously send first measurement compensation information to the target terminal, behavior of preempting a user (a first terminal) between the cells may be caused. Therefore, the user may access a non-optimal cell. Therefore, in a possible implementation, when a user in coverage of a same AAU is handed over within a range of a plurality of cells obtained through splitting of the coverage of the AAU, determining is performed by using the first measurement value and the second measurement value based on uplink RSRP measurement. To be specific, when the serving cell and the target cell are cells corresponding to a same AAU, measurement is performed based on uplink RSRP, to avoid a ping-pong handover caused by using a downlink measurement reporting manner.

In this embodiment of this application, the serving cell sends, to the first terminal, the first message that is used to set the measurement bandwidth as the center bandwidth, reduces the power in the second bandwidth, and increases the power in the center bandwidth, so that the first terminal receives a stronger measurement signal based on a fact that the measurement bandwidth is the center bandwidth. This improves coverage of a signal of the serving cell.

The foregoing describes the power adjustment method in embodiments of this application, and the following describes the serving cell in this application.

Figure 12:
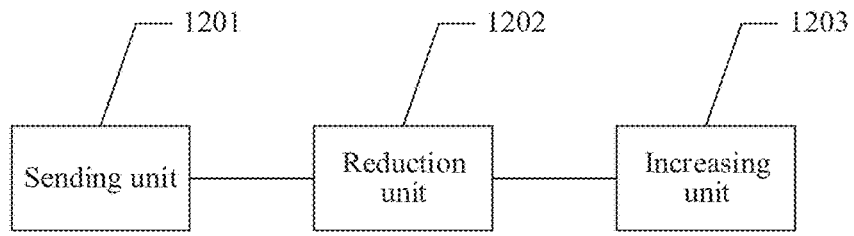
FIG. 12 is a schematic diagram of a structure of a serving cell according to an embodiment of this application.

FIG. 12 is a schematic diagram of a structure of a serving cell according to an embodiment of this application.

A serving cell includes:
a sending unit 1201, configured to send a first message to a first terminal, where the first message indicates the first terminal to configure a first measurement bandwidth as a center bandwidth, a frequency range of the center bandwidth is less than a frequency range of a full bandwidth, the full bandwidth represents a maximum bandwidth allocated to the serving cell, and the first measurement bandwidth is a bandwidth used by the first terminal to measure channel quality;
a reduction unit 1202, configured to reduce power in a second bandwidth, where a frequency range of the second bandwidth is a frequency range obtained by subtracting the frequency range of the center bandwidth from the frequency range of the full bandwidth; and
an increasing unit 1203, configured to increase power in the center bandwidth.

In this embodiment of this application, the method performed by the units of the serving cell is similar to the method performed by the serving cell in the embodiment shown in FIG. 2. Details are not described herein again.

Figure 13:
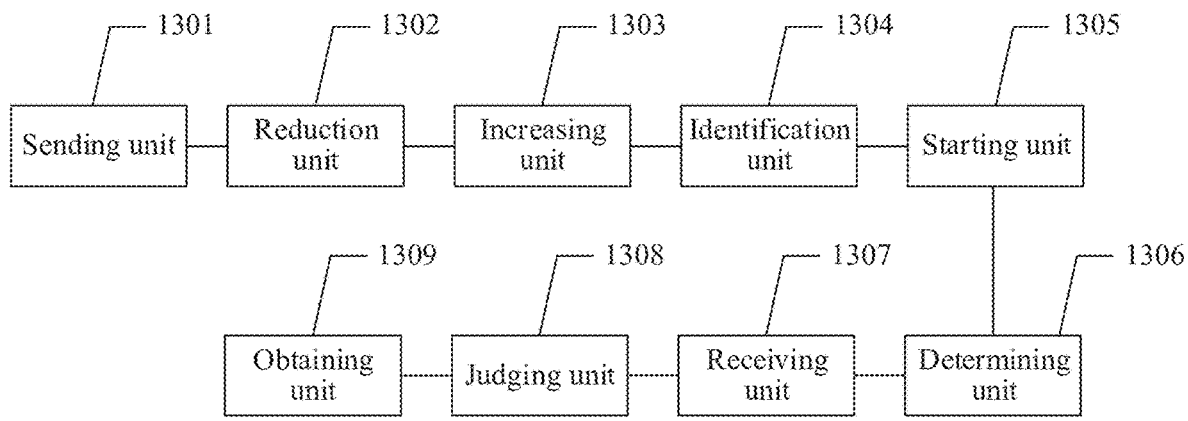
FIG. 13 is a schematic diagram of another structure of a serving cell according to an embodiment of this application.

FIG. 13 is a schematic diagram of another structure of a serving cell according to an embodiment of this application.

A serving cell includes:
a sending unit 1301, configured to send a first message to a first terminal, where the first message indicates the first terminal to configure a first measurement bandwidth as a center bandwidth, a frequency range of the center bandwidth is less than a frequency range of a full bandwidth, the full bandwidth represents a maximum bandwidth allocated to the serving cell, and the first measurement bandwidth is a bandwidth used by the first terminal to measure channel quality;
a reduction unit 1302, configured to reduce power in a second bandwidth, where a frequency range of the second bandwidth is a frequency range obtained by subtracting the frequency range of the center bandwidth from the frequency range of the full bandwidth; and
an increasing unit 1303, configured to increase power in the center bandwidth.

Optionally, the increasing unit 1303 is specifically configured to increase power of a cell-specific reference signal CRS port in the center bandwidth, where the CRS port is configured to send a CRS signal, and the CRS signal is used by the first terminal to measure channel quality.

Optionally, the CRS port includes a CRS port 0 and a CRS port 1, and the increasing unit is specifically configured to increase power of the CRS port 0 and the CRS port 1 in the center bandwidth.

Optionally, the reduction unit 1302 is specifically configured to reduce power of the CRS port in the second bandwidth, where the CRS port is used to send a CRS signal, and the CRS signal is used by the first terminal to measure channel quality.

Optionally, the CRS port includes a CRS port 2 and a CRS port 3, and the reduction unit is specifically configured to reduce power of the CRS port 2 and the CRS port 3 in the second bandwidth.

Optionally, the first terminal includes a target terminal, the target terminal is a terminal that does not support an indication of the first message. The serving cell further includes:
an identification unit 1304, configured to identify the target terminal; and
an obtaining unit 1309, configured to obtain first measurement compensation information, where the first measurement compensation information is used to compensate a measurement value of the target terminal, so that the target terminal keeps connected to the serving cell.

Optionally, when the target terminal accesses the serving cell, the serving cell further includes:
a starting unit 1305, configured to start a timer.

If the target terminal is handed over to a target cell before the timer expires, the serving cell further includes:
a determining unit 1306, configured to determine that the target terminal is the terminal that does not support the indication of the first message, and the target cell is a neighboring cell.

Optionally, the identification unit 1304 is specifically configured to compare a first measurement value of the target terminal with a second measurement value of the target terminal to obtain a measurement difference, where the first measurement value is a value obtained by measuring channel quality of the serving cell before the target terminal is handed over to the serving cell, and the second measurement value is a value obtained by measuring channel quality of the serving cell after the target terminal is handed over to the serving cell.

If the measurement difference is greater than a preset threshold, the determining unit 1306 is specifically configured to determine that the target terminal is the terminal that does not support the indication of the first message.

Optionally, the serving cell further includes:
a receiving unit 1307, configured to receive the first measurement value sent by the target cell, where the first measurement value is a value obtained by measuring channel quality of the serving cell when the terminal is connected to the target cell.

Optionally, the serving cell and the target cell are cells corresponding to a same active antenna array AAU, and the first measurement value and the second measurement value are measured based on uplink RSRP of the serving cell.

Optionally, the serving cell further includes:
a judging unit 1308, configured to determine, based on uplink quality of the target terminal and downlink quality of the target terminal, whether the target terminal performs cell handover.

If either the uplink quality of the target terminal or the downlink quality of the target terminal is less than the preset threshold, the sending unit 1301 is further configured to send a handover command to the target terminal, where the handover command instructs the target terminal to perform cell handover.

In this embodiment of this application, the method performed by the units of the serving cell is similar to the method performed by the serving cell in the embodiment shown in FIG. 2. Details are not described herein again.

Figure 14:
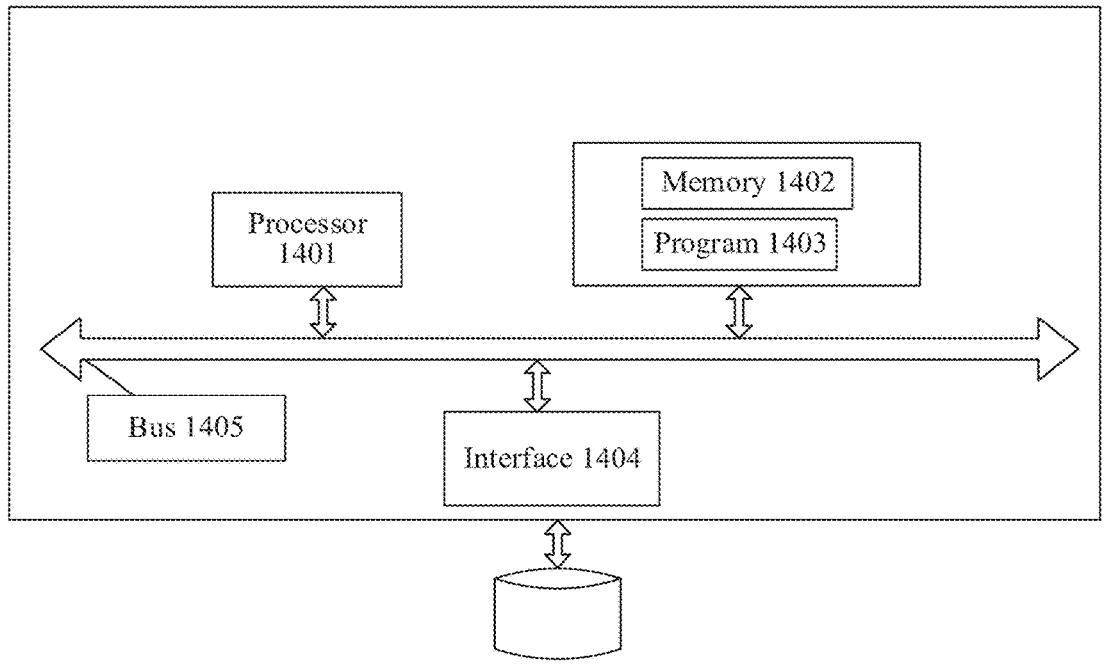
FIG. 14 is a schematic diagram of another structure of a serving cell according to an embodiment of this application.

FIG. 14 is a schematic diagram of another structure of a serving cell according to an embodiment of this application.

A serving cell includes: a processor 1401, a memory 1402, a bus 1405, and an interface 1404. The processor 1401 is connected to the memory 1402 and the interface 1404, the bus 1405 is separately connected to the processor 1401, the memory 1402, and the interface 1404, the interface 1404 is configured to receive or send data, and the processor 1401 is a single-core or multi-core central processing unit, or an application-specific integrated circuit, or one or more integrated circuits configured to implement this embodiment of the present disclosure. The memory 1402 may be a random access memory (random access memory, RAM), or may be a non-volatile memory (non-volatile memory), for example, at least one hard disk memory. The memory 1402 is configured to store computer-executable instructions. Specifically, the computer-executable instructions may include a program 1403.

In this embodiment, when the processor 1401 invokes the program 1403, the serving cell in FIG. 14 is enabled to perform operations performed by the serving cell in the embodiment shown in FIG. 2. Details are not described herein again.

It should be understood that the processor mentioned in the serving cell in the foregoing embodiments of this application, or the processor provided in the foregoing embodiments of this application may be a central processing unit (central processing unit, CPU), or may be another general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should be further understood that in the foregoing embodiments of this application, there may be one or more processors in the serving cell. A quantity of processors may be adjusted based on an actual application scenario, is merely an example for description herein, and is not limited. There may be one or more memories in embodiments of this application. A quantity of memories may be adjusted based on an actual application scenario. This is merely an example for description herein, and is not limited.

It should be further noted that when the serving cell includes a processor (or a processing unit) and a memory, the processor in this application may be integrated with the memory, or the processor may be connected to the memory through an interface. This may be adjusted based on an actual application scenario, and is not limited.

This application provides a chip system. The chip system includes a processor, configured to support a serving cell in implementing a function of the controller in the foregoing method, for example, processing data and/or information in the foregoing method. In a possible design, the chip system further includes a memory. The memory is configured to store necessary program instructions and necessary data. The chip system may include a chip, or may include a chip and another discrete component.

In another possible design, when the chip system is a chip in user equipment, an access network, or the like, the chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the serving cell or the like performs the steps performed by the first serving cell in any one of the embodiment in FIG. 3 or FIG. 4. Optionally, the storage unit is a storage unit in the chip, for example, a register or a cache. Alternatively, the storage unit may be a storage unit that is in the serving cell and that is located outside the chip, for example, a read-only memory (read-only memory, ROM) or another type of static storage device that can store static information and instructions, or a random access memory (random access memory, RAM).

An embodiment of this application further provides a computer-readable storage medium. The computer-readable storage medium stores a computer program. When the computer program is executed by a computer, the method procedure performed by the controller of the serving cell in any one of the foregoing method embodiments is implemented. Correspondingly, the computer may be the foregoing serving cell.

It should be understood that, the controller or the processor mentioned in the foregoing embodiments of this application may be a central processing unit (central processing unit, CPU), or may be one or a combination of more of another general purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should be further understood that there may be one or more processors or controllers in the serving cell, the chip system, or the like in the foregoing embodiments of this application. A quantity of processors or controllers may be adjusted based on an actual application scenario, is merely an example for description herein, and is not limited. There may be one or more memories in embodiments of this application. A quantity of memories may be adjusted based on an actual application scenario. This is merely an example for description herein, and is not limited.

It should be further understood that the memory, the readable storage medium, or the like mentioned in the serving cell or the like in the foregoing embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

Persons of ordinary skill in the art may understand that all or some of the steps performed by the serving cell or the processor 2102 to implement the foregoing embodiments may be implemented by hardware or a program instructing relevant hardware. The program may be stored in a computer-readable storage medium. The storage medium mentioned above may be a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether these functions are performed by hardware or software depends on particular applications and design constraints of the technical solutions. Persons skilled in the art may use different methods to implement the described functions for each particular application, but it should not be considered that the implementation goes beyond the scope of this application.

When the software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The terms used in embodiments of this application are merely for the purpose of illustrating specific embodiments, and are not intended to limit the present disclosure. "One" and "the" of singular forms used in embodiments of this application are also intended to include a majority form, unless the context clearly indicates another meaning. It should be further understood that, in the descriptions of this application, "I" represents an "or" relationship between associated objects, unless otherwise specified. For example, A/B may represent A or B. A term "and/or" in this application is merely an association relationship between associated objects, and represents that three relationships may exist. For example, A and/or B may represent the following three cases: Only A exists, both A and B exist, and only B exists, where A and B each may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A power adjustment method, comprising:
sending, by a base station in a serving cell, a first message to a first terminal, wherein the first message indicates the first terminal to configure a first measurement bandwidth as a center bandwidth, a frequency range of the center bandwidth is less than a frequency range of a full bandwidth, the full bandwidth represents a maximum bandwidth allocated to the serving cell, and the first measurement bandwidth is a bandwidth used by the first terminal to measure channel quality;
reducing, by the base station, power in a second bandwidth while increasing power in the center bandwidth, wherein a frequency range of the second bandwidth is a frequency range obtained by subtracting the frequency range of the center bandwidth from the frequency range of the full bandwidth;
identifying, by the base station, that the first terminal does not support an indication of the first message;
obtaining, by the base station in response to the identifying, first measurement compensation information that comprises a measurement compensation value for compensating a measurement value of the serving cell and a handover hysteresis value for compensating a measurement value of a neighboring cell; and
sending, by the base station, the first measurement compensation information to the first terminal such that the first terminal compensates the measurement value of the serving cell based on the measurement compensation value and compensates the measurement value of the neighboring cell based on the handover hysteresis value.

2. The method of claim 1, wherein the identifying, by the base station, that the first terminal does not support the indication of the first message comprises:
starting a timer when the first terminal accesses the serving cell; and
if the first terminal is handed over to the neighboring cell before the timer expires, determining that the first terminal does not support the indication of the first message.

3. The method of claim 1, wherein the identifying, by the base station, that the first terminal does not support the indication of the first message comprises:
comparing a first measurement value of the first terminal with a second measurement value of the first terminal to obtain a measurement difference, wherein the first measurement value is a value obtained by measuring channel quality of the serving cell before the first terminal is handed over from the neighboring cell to the serving cell, and the second measurement value is a value obtained by measuring channel quality of the serving cell after the first terminal is handed over from the neighboring cell to the serving cell; and
if the measurement difference is greater than a preset threshold, determining that the first terminal does not support the indication of the first message.

4. The method of claim 3, wherein the serving cell and the neighbor cell are cells corresponding to a same active antenna array (AAU), and the first measurement value and the second measurement value are measured based on uplink reference signal receiving power (RSRP) of the serving cell without downlink RSRP of the serving cell.

5. The method of claim 1, wherein the base station is configured with a first set of cell-specific reference signal (CRS) ports and a second CRS ports for sending CRS signals, and the reducing, by the base station, the power in the second bandwidth while increasing power in the center bandwidth comprises:
reducing power of the second set of CRS ports in the second bandwidth without reducing power of the first set of CRS ports in the second bandwidth; and
increasing power of the first set of CRS ports in the central bandwidth, or both power of the first set of CRS ports and power of the second set of CRS ports in the central bandwidth.

6. The method of claim 1, wherein the base station is configured with a first set of cell-specific reference signal (CRS) ports and a second CRS ports for sending CRS signals, and the reducing, by the base station, the power in the second bandwidth while increasing power in the center bandwidth comprises:
reducing power of the first set of CRS ports in the second bandwidth and power of the second set of CRS ports in the second bandwidth; and
increasing power of the first set of CRS ports in the central bandwidth, or both power of the first set of CRS ports and power of the second set of CRS ports in the central bandwidth.

7. The method of claim 1, wherein the handover hysteresis value of the neighboring cell is used by the first terminal to compensate the measurement value of the neighboring cell, thereby avoiding a ping-pong handover between the serving cell and the neighboring cell.

8. The method of claim 1, wherein the measurement compensation value is added to the measurement value of the serving cell and the handover hysteresis value is subtracted from the measurement value of the neighboring cell.

9. A communication apparatus, comprising:
a processor, and
a non-transitory memory storing program instructions that, when executed by the processor, cause the communication apparatus to perform the operations:
sending a first message to a first terminal accessing to a serving cell, wherein the first message indicates the first terminal to configure a first measurement bandwidth as a center bandwidth, a frequency range of the center bandwidth is less than a frequency range of a full bandwidth, the full bandwidth represents a maximum bandwidth allocated to the serving cell, and the first measurement bandwidth is a bandwidth used by the first terminal to measure channel quality;
reducing power in a second bandwidth while increasing power in the center bandwidth, wherein a frequency range of the second bandwidth is a frequency range obtained by subtracting the frequency range of the center bandwidth from the frequency range of the full bandwidth;
identifying that the first terminal does not support an indication of the first message;
in response to the identifying, obtaining first measurement compensation information that comprises a measurement compensation value for compensating a measurement value of the serving cell and a handover hysteresis value for compensating a measurement value of a neighboring cell; and
sending the first measurement compensation information to the first terminal such that the first terminal compensates the measurement value of the serving cell based on the measurement compensation value and compensates the measurement value of the neighboring cell based on the handover hysteresis value.

10. The communication apparatus of claim 9, wherein the program instructions cause the communication apparatus to perform the operations:
   starting a timer when the first terminal accesses the serving cell; and
   if the first terminal is handed over to the neighboring cell before the timer expires, determining that the first terminal does not support the indication of the first message.

11. The communication apparatus of claim 9, wherein the identifying that the first terminal does not support the indication of the first message comprises:
   comparing a first measurement value of the first terminal with a second measurement value of the first terminal to obtain a measurement difference, the first measurement value is a value obtained by measuring channel quality of the serving cell before the first terminal is handed over from the neighboring cell to the serving cell, and the second measurement value is a value obtained by measuring channel quality of the serving cell after the first terminal is handed over from the neighboring cell to the serving cell; and
   if the measurement difference is greater than a preset threshold, determining that the first terminal does not support the indication of the first message.

12. The communication apparatus of claim 11, wherein the serving cell and the neighboring cell are cells corresponding to a same active antenna array (AAU), and the first measurement value and the second measurement value are measured based on uplink RSRP of the serving cell without downlink RSRP of the serving cell.

13. The communication apparatus of claim 11, wherein the communication apparatus is configured with a first set of cell-specific reference signal (CRS) ports and a second CRS ports for sending CRS signals, and the reducing, by the base station, the power in the second bandwidth while increasing power in the center bandwidth comprises:
   reducing power of the second set of CRS ports in the second bandwidth without reducing power of the first set of CRS ports in the second bandwidth; and
   increasing power of the first set of CRS ports in the central bandwidth, or both power of the first set of CRS ports and power of the second set of CRS ports in the central bandwidth.

14. The communication apparatus of claim 9, wherein the communication apparatus is configured with a first set of cell-specific reference signal (CRS) ports and a second CRS ports for sending CRS signals, and the reducing, by the base station, power in the second bandwidth while increasing power in the center bandwidth comprises:
   reducing power of the first set of CRS ports in the second bandwidth and power of the second set of CRS ports in the second bandwidth; and
   increasing power of the first set of CRS ports in the central bandwidth, or both power of the first set of CRS ports and power of the second set of CRS ports in the central bandwidth.

15. The communication apparatus of 9, wherein the handover hysteresis value of the neighboring cell is used by the first terminal to compensate the measurement value of the neighboring cell, thereby avoiding a ping-pong handover between the serving cell and the neighboring cell.

16. The communication apparatus of 9, wherein the measurement compensation value is added to the measurement value of the serving cell and the handover hysteresis value is subtracted from the measurement value of the neighboring cell.

17. A communication apparatus, comprising:
   a processor, and
   a non-transitory memory storing program instructions that, when executed by the processor, cause the communication apparatus to perform the operations:
   receiving a first message to a first terminal accessing from a serving cell, wherein the first message indicates the communication apparatus to configure a first measurement bandwidth as a center bandwidth, a frequency range of the center bandwidth is less than a frequency range of a full bandwidth, the full bandwidth represents a maximum bandwidth allocated to the serving cell, and the first measurement bandwidth is a bandwidth used by the communication apparatus to measure channel quality;
   receiving first measurement compensation information from the serving cell, wherein first measurement compensation information comprises a measurement compensation value for compensating a measurement value of the serving cell and a handover hysteresis value for compensating a measurement value of a neighboring cell; and
   measuring reference signals to obtain the measurement value of the serving cell and the measurement value of the neighboring cell;
   compensating the measurement value of the serving cell based on the measurement value of the serving cell, to obtain a compensated measurement value of the serving cell; and
   compensating the measurement value of the neighboring cell base on the handover hysteresis value, to obtain a compensated measurement value of the neighboring cell.

18. The communication apparatus of claim 17, wherein the program instructions further cause the communication apparatus to perform the operations:
   determining that the compensated measurement of the serving cell is larger than the compensated measurement value of the neighboring cell; and
   determining to keep connected to the serving cell without handing over to the neighboring cell.

19. The communication apparatus of 17, wherein the measurement compensation value is added to the measurement value of the serving cell and the handover hysteresis value is subtracted from the measurement value of the neighboring cell.

* * * * *